UNITED STATES PATENT OFFICE.

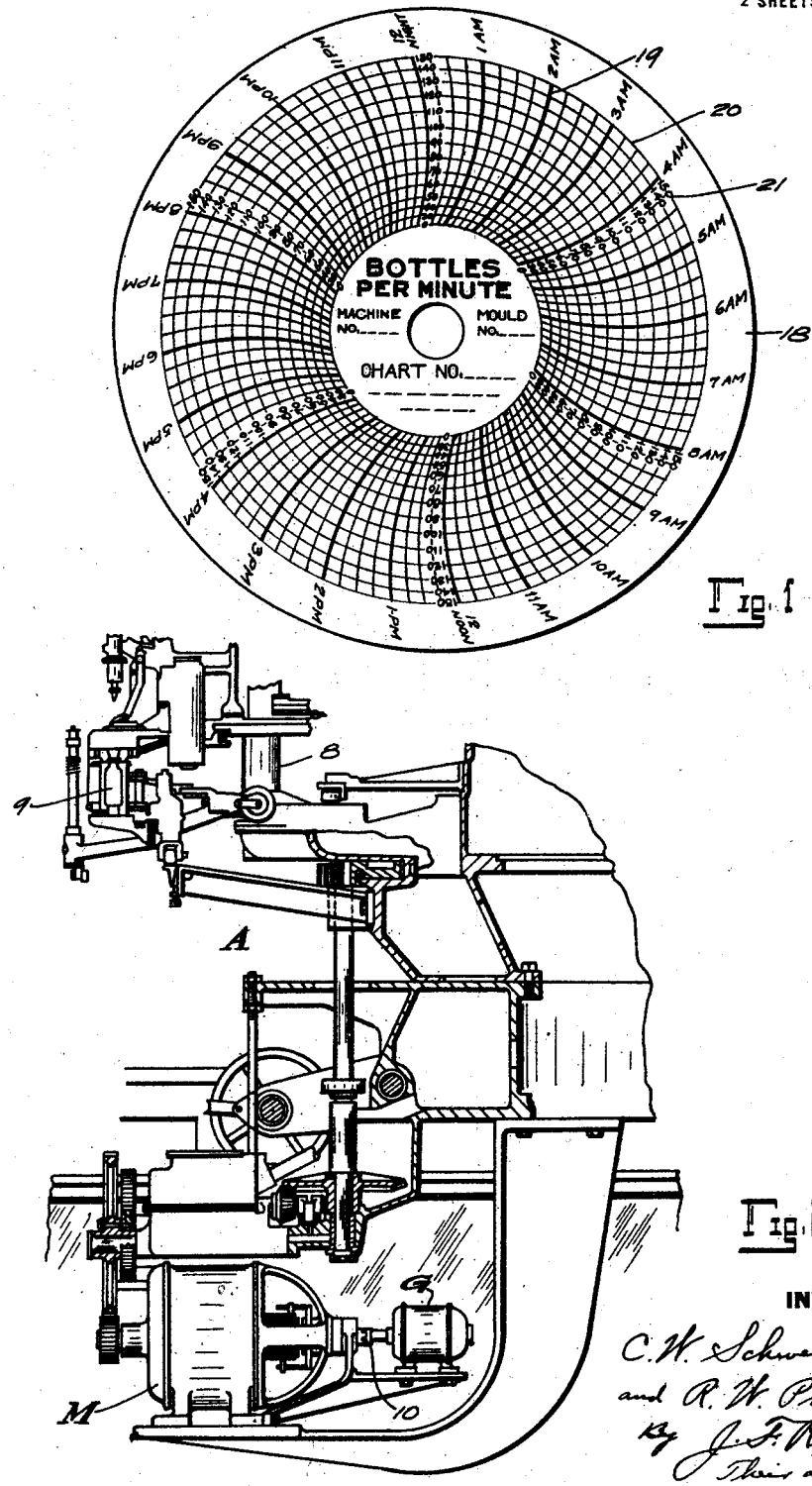

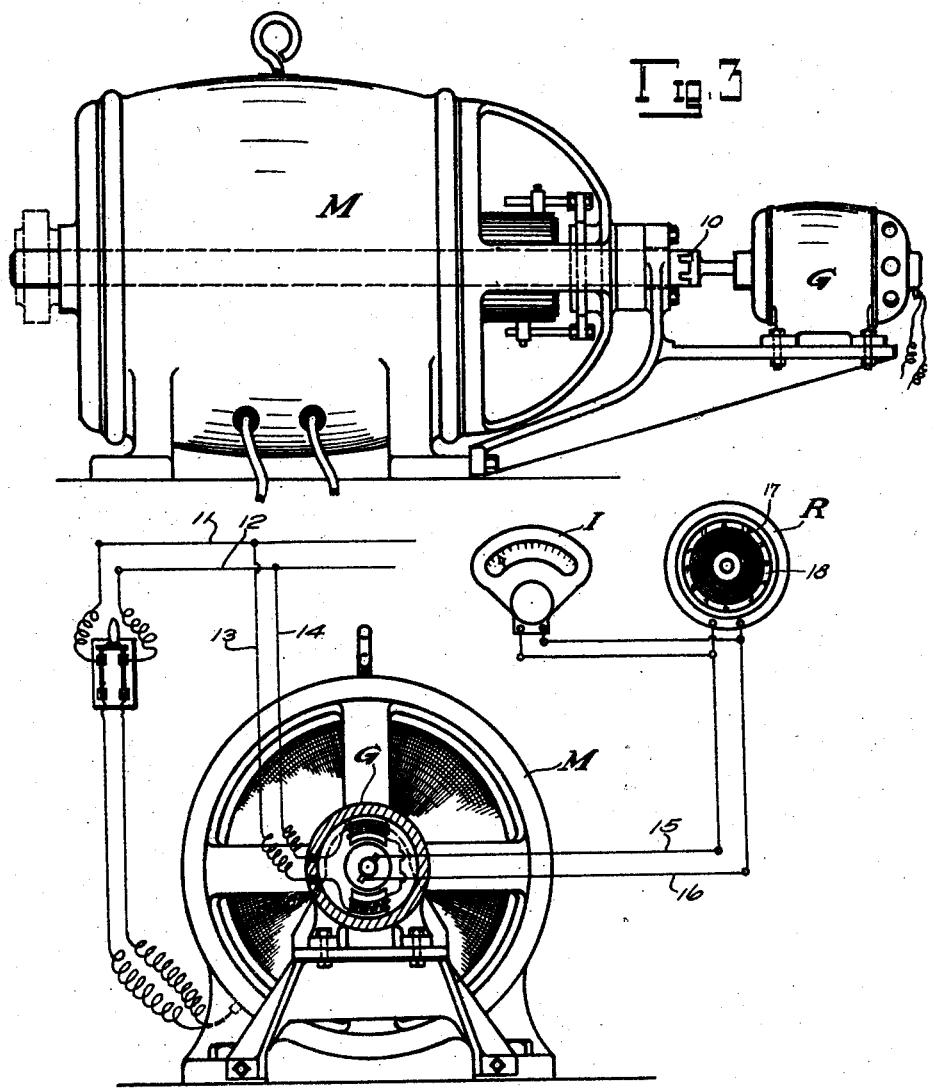

REECE WILMER PRESS AND CHARLES WILLY SCHWENZFEIER, OF GLASSBORO, NEW JERSEY, ASSIGNORS TO THE OWENS BOTTLE COMPANY, OF TOLEDO, OHIO, A CORPORATION OF OHIO.

ELECTRICAL RECORDING APPARATUS.

1,416,751.　　　　　Specification of Letters Patent.　　Patented May 23, 1922.

Application filed April 19, 1920. Serial No. 375,054.

*To all whom it may concern:*

Be it known that we, REECE W. PRESS and CHARLES WILLY SCHWENZFEIER, citizens of the United States, residing at Glassboro, in the county of Gloucester and State of New Jersey, have invented new and useful Improvements in Electrical Recording Apparatus, of which the following is a specification.

Our invention relates to electrically operated indicating and recording apparatus adapted to indicate and record the speed, output, or performance at all times of a machine or apparatus which is doing work.

A feature of the invention consists in providing, in combination with a recording instrument, a suitable electric generator having its field windings connected with a constant potential circuit, so that an operating current will be supplied to said instrument substantially proportional to the speed of the machine or apparatus whose performance is to be recorded, the generator being connected to be driven at a speed proportional to said machine or apparatus. The invention is herein shown in connection with an automatic bottle making machine, to record the speed, output and stoppages of the machine.

In the accompanying drawings:

Figure 1 is a view of an indicator card on which may be recorded the performance of a bottle machine.

Figure 2 is a fragmentary view of a bottle machine, its motor, and a generator supplying current to the indicating and recording instruments.

Figure 3 is an elevation of the motor and generator.

Figure 4 is an end view of the same, the generator being shown in section, the indicating and recording instruments also being shown.

An automatic glass blowing machine A comprises a mold carriage 8 which rotates continuously about a vertical axis, being driven by a motor M through a suitable train of gearing. Mounted on the mold carriage is a set of molds in which the bottles 9 are blown and from which they are discharged seriatim. Reference may be had to patent to La France, #1,185,687, for a detailed disclosure of such a machine.

In order to indicate and record the performance of the machine, a recording indicator R is provided which is excited by an electric current from a generator G which is connected to run in synchronism with and at a speed proportional to that of the machine A. As herein shown, the generator is directly connected through a flexible coupling 10 to the motor shaft. The motor M is supplied with current from any suitable source and as here shown is connected to the direct current constant potential mains 11 and 12. The generator G is a direct current generator and has its field windings connected to any suitable source of constant potential, and as herein shown is connected through conductors 13 and 14 to the mains 11 and 12. The strength of the generator field is, therefore, substantially constant for all speeds of the generator and the potential of the generator brushes is substantially proportional to the speed of the generator.

Conductors 15 and 16 lead from the generator brushes to the recording meter R which may be of standard construction and which comprises an arm 17 arranged to swing radially across the face of an indicator card 18 on the recording instrument. The indicator card is provided with appropriate markings for indicating and recording the performance of a particular type or character of machine with which the instrument may be used. As herein shown, this card is designed to indicate in bottles per minute, the output of the glass blowing machine with which it is connected. For this purpose the card comprises radially disposed lines 19 indicating hours and one-quarter hours. Concentric circles 20 are designated by Figures 21 which represent the output of the machine in bottles per minute. The arm 17 is provided, as is usual in instruments of this character, with a recording stylus which swings radially across the face of the card, the position of the stylus being at all times determined by the speed of the generator. The indicator R comprises the usual clockwork for rotating the disk. The stylus will, therefore, record on the disk a line or marking (which may, for example, be in red ink) which indicates the operation of the machine. The card, as shown, is adapted for a twenty-four hour record and records the speed of the machine during this entire period. If the machine has been slowed down or stopped at any time during the twenty-four hours for repairs or other purpose, the indicator card will show when and for what length of time the machine has been idle.

An electrical indicator I (Figure 4) may be connected to the generator to indicate at any time the speed of the machine, the dial of the indicator being graduated to indicate revolutions per minute of the bottle machine, or the number of bottles per minute, as may be desired. The indicators I and R may be located at any convenient point distant from the machine.

It will be understood that although the invention is herein shown as adapted to indicate the performance of a glass blowing machine, it is not limited to such use, as it may be adapted to indicate the speed, performance or output of a great variety of machines or mechanisms.

Modifications of the construction of the apparatus and arrangements of parts may be made without departing from the spirit and scope of our invention.

What we claim is:

1. The combination with a machine and driving means therefor, of an electric generator connected to be driven at a speed proportional to that of the machine, means for exciting the generator field from a constant potential source independent of the speed of said machine, and a recording indicator actuated by current supplied from the generator and operative to produce a continuous record indicating the speed of the machine for all periods of its operation.

2. The combination with a machine and driving means therefor, of an electric generator connected to be driven at a speed proportional to that of the machine, means for exciting the generator field from a constant potential source independent of the speed of said machine, a recording indicator actuated by current supplied from the generator and operative to produce a continuous record indicating the speed of the machine for all periods of its operation, said indicator comprising a recording stylus, and an indicator card having graduated markings thereon designating the performance of the machine.

3. The combination of a machine, means to drive it, a direct current generator, driving connections by which the generator is driven at a speed proportional to that of the machine, constant potential mains connected to the generator field windings, and an indicator electrically connected to the brushes of the generator and operative to produce a continuous record indicating the speed of the machine for all periods of its operation.

4. The combination with a continuously rotating glass forming machine from which glass articles formed thereon are periodically discharged, of a direct current generator connected therewith to be driven at a speed proportional to that of the machine, a source of constant potential current from which current is supplied to the field windings of the generator, and a recording indicator electrically connected to the generator to be actuated thereby and comprising a card and an indicator having graduated markings and designating characters indicating the rate at which the articles are delivered by said machine.

Signed at Glassboro, in the county of Gloucester, and State of New Jersey, this 8th day of April, 1920.

REECE WILMER PRESS.
CHARLES WILLY SCHWENZFEIER.